(12) United States Patent
Miesak

(10) Patent No.: US 9,007,678 B2
(45) Date of Patent: Apr. 14, 2015

(54) MONOLITHIC FIXED OPTICAL DELAY GENERATORS

(75) Inventor: Edward Miesak, Windermere, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 492 days.

(21) Appl. No.: 13/313,347

(22) Filed: Dec. 7, 2011

(65) Prior Publication Data

US 2012/0154903 A1  Jun. 21, 2012

Related U.S. Application Data

(60) Provisional application No. 61/425,563, filed on Dec. 21, 2010.

(51) Int. Cl.
| | |
|---|---|
| G02F 1/35 | (2006.01) |
| H01S 3/08 | (2006.01) |
| G02B 27/14 | (2006.01) |
| G02F 1/39 | (2006.01) |

(52) U.S. Cl.
CPC ............ *G02B 27/142* (2013.01); *G02F 1/39* (2013.01); *G02F 2001/392* (2013.01); *G02F 2201/17* (2013.01); *G02F 2201/34* (2013.01)

(58) Field of Classification Search
None
See application file for complete search history.

(56) References Cited

U.S. PATENT DOCUMENTS

| | | | | |
|---|---|---|---|---|
| 4,797,893 | A | * | 1/1989 | Dixon .............................. 372/66 |
| 5,101,415 | A | * | 3/1992 | Kolb et al. ....................... 372/99 |
| 5,226,054 | A | * | 7/1993 | Yarborough et al. .......... 372/100 |
| 5,303,256 | A | * | 4/1994 | Sumida .......................... 372/106 |
| 6,647,034 | B1 | | 11/2003 | Smith et al. |
| 6,658,034 | B2 | * | 12/2003 | Garnache et al. ......... 372/45.013 |
| 2003/0161024 | A1 | * | 8/2003 | Zhang et al. ................... 359/260 |
| 2011/0194172 | A1 | * | 8/2011 | Esteban Martin et al. .... 359/330 |

* cited by examiner

*Primary Examiner* — Hemang Sanghavi
(74) *Attorney, Agent, or Firm* — Terry M. Sanks, Esq.; Beusse Wolter Sanks & Maire, P.A.

(57) ABSTRACT

A monolithic fixed optical delay generator includes an optical substrate having a front face and a back face. A front coating is on the front face and a back coating is on the back face. The front coating is (i) highly reflective to a first wavelength and highly transmissive to a second wavelength while the back coating is highly reflective to the second wavelength, or (ii) the front coating is highly reflective to the second wavelength and is highly transmissive to the first wavelength while the back coating is highly reflective to the first wavelength.

13 Claims, 3 Drawing Sheets

MONOLITHIC FIXED OPTICAL DELAY GENERATORS

CROSS REFERENCE TO RELATED APPLICATIONS

This application claims the benefit of Provisional Application Ser. No. 61/425,563 entitled "COATED SUBSTRATE OPTICAL DELAY GENERATORS AND DOUBLE-PASS OPTICAL PARAMETRIC AMPLIFIERS THEREFROM", filed Dec. 21, 2010, which is herein incorporated by reference in its entirety.

FIELD

Disclosed embodiments relate to optical delay generators for temporal synchronization, such as for double-pass Optical Parametric Amplifiers.

BACKGROUND

Optical parametric amplification is a non-linear optical process where light at one wavelength, the pump wavelength, is used to generate light at two other (longer) wavelengths in a non-linear (NL) optical material with a non-vanishing second order non-linear susceptibility. Optical gain is established at the two generated wavelengths, conventionally referred to as the signal wavelength and the idler wavelength. The sum of the energies of a signal photon and an idler photon are equal to the energy of a pump photon. There is no fundamental physical distinction between the idler photon and the signal photon. However, it is customary to refer to the shorter of the two generated wavelengths as the signal and the longer generated wavelength as the idler. An optical parametric oscillator (OPO) comprises an optical cavity containing a NL optical material which provides optical amplification when pumped by a beam of laser radiation at a pump frequency from a pump source.

An optical parametric amplifier (OPA) is a laser light source that emits light of variable wavelengths by an optical parametric amplification process that can also be referred to as Optical Parametric Generation (OPG). OPAs are typically used to amplify a pulse that is compatible with the particular OPA. A double-pass OPA is formed by including an optical delay generator in the OPA system that can almost double the total gain extracted from a single pass OPA by transferring pump pulse energy to both a first and a second signal or idler pulse, instead of energy transfer to only a single signal/idler pulse.

A double-pass OPA is simply a single pass OPA with a mirror at the output that sends both of the respective pulses back through the NL crystal a second time. A double-pass requires the pump and signal or idler pulse to be re-synchronized with each other since passing the pulses through the NL crystal dephases them with respect to each other. The OPA gain is instantaneous. The gain coefficient is proportional to the pump pulse intensity, resulting in the gain for the OPA changing along the pump pulse profile.

Accordingly, for a double-pass OPA system temporal alignment of the signal pulses and pump pulse is needed for maximum gain. The first and second pass pulses to be amplified (signal or idler) both need to temporally overlap with the pump pulse while these pulses are inside the NL optical material. Temporal synchronization gets more difficult as the respective pulse widths get shorter.

Optimum pulse spacing between signal/idler pulses is required for best possible system performance (i.e., maximum output power). FIG. 1 is a depiction that demonstrates an ideal time synchronization that provides optimum pulse spacing between first and second pass signal/idler pulses and a pump pulse for a double-pass OPA to provide maximum energy transfer needed for maximum power output to the signal/idler pulses. Specifically, ideally the first and second pass of the signal/idler pulses are placed as close as possible to the center of the pump pulse without overlapping one another. As described below, the first and second passes of the signal/idler pulses cannot be directly overlapped with one another within the pump pulse because at high gain they would be operating in the depleted gain region.

The larger Gaussian envelope in FIG. 1 represents the time profile of the pump pulse shown as an example 7 ps wide pulse. The two smaller Gaussian profiles (shown each as 1 ps wide pulses) represent the temporal profile of the signal/idler pulses. One of the smaller profiles represents the first pass through the OPA while the other smaller profile represents the second pass through the OPA. The respective signal/idler pulses are delayed against each other relative to the pump pulse (shown as a 4 ps relative delay) by an optical delay so they do not both pass through the pump pulse in the same temporal position, since the second signal/idler pulse must be shifted to a fresh portion of the pump pulse where the energy of the pulse has not been depleted, so the maximum possible energy transfer can occur.

Conventional double-pass OPAs utilize multi-component optical-mechanical system-based optical delay generators for the required time synchronization which comprise beam splitters, mirrors, and translation stages. Such optical-mechanical system-based optical delay generators are bulky, and are generally difficult to obtain good results from. Involved measurements are also needed to ensure that the delay is accurate to the level required. Moreover, conventional multi-component optical delay generators can be difficult to work with, and are susceptible to being knocked out of alignment.

SUMMARY

Disclosed embodiments include monolithic fixed optical delay generators and optical systems therefrom including dual-pass Optical Parametric Amplifier (OPA) systems. As used herein, a "monolithic" fixed optical delay generator refers to optical arrangements comprising a plurality of different optical components that are all bonded together to provide a single "block", such as being diffusion bonded together or being bonded together by an optical epoxy.

Disclosed monolithic fixed optical delay generators comprise an optical substrate that includes both a front coating and back coating bonded thereto, where the front coating and back coating are different coatings that each target specific different wavelengths. In one embodiment the front coating is highly reflective to the signal or idler pulse (hereafter "signal pulse") at a first wavelength and is highly transmissive to the pump pulse at a second wavelength, while the back coating is highly reflective to the pump pulse. In another embodiment the front coating is highly reflective to the pump pulse and highly transmissive to the signal pulse, while the back coating is highly reflective to the signal pulse. As used herein a disclosed coating being "highly reflective" to a particular wavelength of light refers to a reflectivity of at least 85%, while a disclosed coating being "highly transmissive" to a particular wavelength of light refers to a transmittance of at least 85%.

In disclosed dual-pass OPA systems the optical substrate of the monolithic fixed optical delay generator has a thickness and refractive index selected to provide a predetermined fixed relative delay between the signal pulse and the pump pulse so that the signal pulse resides inside the pump pulse at a non-linear (NL) optical material that is within the optical cavity of the OPA system at a first position and a second position spaced apart from the first position by the fixed relative delay. The monolithic fixed optical delay generator also provides the back mirror for the OPA system.

DETAILED DESCRIPTION

Figure 1:
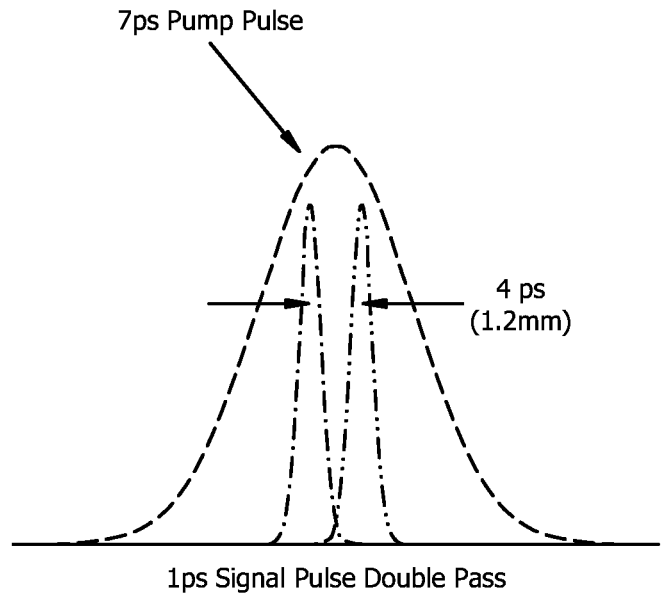
FIG. 1 is a depiction that demonstrates an ideal time synchronization relation to provide optimum pulse spacing between first and second pass signal pulses at a first wavelength and a pump pulse at a second wavelength for a double-pass OPA system to provide maximum energy transfer to maximize signal power output.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Figure 2:
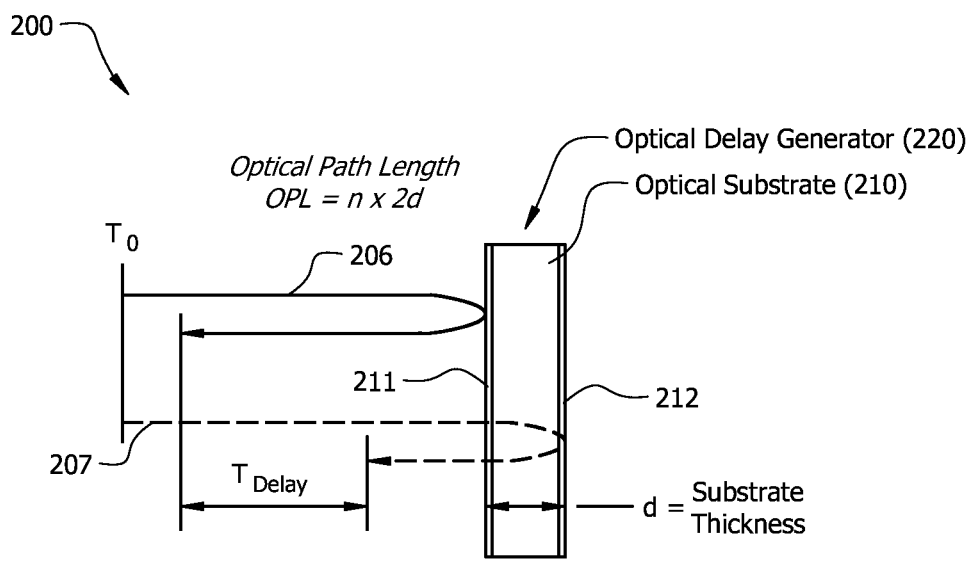
FIG. 2 is a diagram that illustrates how an example disclosed monolithic fixed optical delay generator provides time synchronization of the first and second pass signal pulses and the pump pulse for a double-pass OPA system, according to a disclosed embodiment.

FIG. 2 is a diagram 200 that illustrates how an example disclosed monolithic fixed optical delay generator 220 comprising a coated optical substrate provides time synchronization of first and second pass signal pulses at a first wavelength and a pump pulse at a second wavelength, according to a disclosed embodiment. Disclosed monolithic fixed optical delay generators can replace the conventional optical-mechanical system-based optical delay generators including a translation stage described in the background above.

The optical substrate 210 has a specific thickness (shown as "d") with two different coatings comprising front coating 211 and back coating 212 that each target specific wavelengths. The thickness and material for the optical substrate 210 that sets the refractive index of is selected to produce the desired fixed delay when included as part of a dual-pass OPA system by providing an ideal (or near ideal) synchronization relation to provide optimum pulse spacing within a NL crystal (not shown) between first and second pass signal pulses at a first wavelength within a pump pulse at a second wavelength, such as depicted in FIG. 1.

In the embodiment shown in FIG. 2, the front coating 211 is highly reflective to the signal pulse 206 while being highly transmissive the pump pulse 207, while the back coating 212 is highly reflective to the pump pulse 207. The reflections provided by monolithic fixed optical delay generator 200 directs the pump pulse 207 and signal pulse 206 back through the OPA a second time, thus getting more gain out of the OPA system as compared to the signal gain obtained with only a single pass. Typically, the percent reflection provided by the respective coatings 211 and 212 is above the >85% level defined herein as being "highly reflective". For example, the front coating 211 can provide a reflectivity of >90% for the signal pulse 206, while the back coating 212 can provide a reflectivity >99% for the pump pulse 207.

In operation the pump pulse 207 and the signal pulse 206 enter the optical axis of the system together, such as from the left traveling together in a left to right direction. The pump pulse 207 and signal pulse 206 are thus temporally aligned (synchronized in time) as they enter the depiction shown in FIG. 2. Although not shown, there is an external delay that ensures that the pump pulse 207 and signal pulse 206 are time synchronized together as they enter the OPA system for the first time. Temporal alignment is denoted by the vertical line at $\tau_0$ shown in depiction 200.

The pump pulse 207 and the signal pulse 206 travel together to the monolithic fixed optical delay generator 220 in a left to right direction. A front coating 211 that is highly reflective at the first wavelength is bonded to the front surface of the optical substrate 210. The signal pulse 206 retroreflects from the front coating 211 and begins propagating in a right to left direction.

As known in the art, optical coatings can be designed to be highly reflective only at particular wavelengths (narrow bands) while being highly transmissive (transparent) at other wavelengths. For example, the coatings can comprise a dielectric coating which uses materials with a different refractive index relative to the optical substrate. Dielectric coatings can be constructed from thin layers of materials such as magnesium fluoride, calcium fluoride, and various metal oxides, which can be deposited onto the optical substrate. By selection of the exact composition, thickness, and number of these dielectric layers, it is possible to tailor the reflectivity and transmitivity of the coating to produce almost any desired characteristic. For example, reflection coefficients of surfaces can be reduced to less than 0.2%, producing an antireflection (AR) coating. The reflectivity can also be increased to greater than 99%, producing a high-reflector (HR) coating. The level of reflectivity can also be tuned to any particular value, for instance to produce an optical coating that reflects ≥85% at a first wavelength and transmits ≥85% at a second wavelength, enabled in part because the first and second wavelength are typically spaced more than 100 nm in wavelength for conventional OPA applications.

Since the back coating 212 functions to provide a reflective function only, back coating can comprise a mirror coating comprising a thin layer of a metal, such as aluminum, which can be deposited on optical substrates to make a mirror surface, through a process known as silvering. Back coating 212 may also comprise a dielectric coating.

The front coating 211 can also be configured to provide anti-reflection for the wavelength it transmits, described as the second (pump) wavelength relative to FIG. 2. When front coating 211 is selected to be highly reflective at the first (signal) wavelength, front coating 211 selectively transmits the pump pulse 207 into the optical substrate 210. The pump pulse 207 propagates through the optical substrate 210 and retroreflects off the maximum reflection mirror coating 212 on the back surface of optical substrate 210. The pump pulse 207 then propagates back through the optical substrate 210 a second time. The time it takes for the pump pulse 207 to travel twice (a roundtrip) through the optical delay generator 220 is represented in FIG. 2 by $\tau_{Delay}$. This quantity can be calculated by knowing the index of refraction ($n_f$) of the optical substrate 210 and its thickness (d). The Optical Path Length (OPL) can be calculated using the equation $OPL = n_f \times 2d$, where $n_f$ is the refractive index of the optical substrate 210. The OPL is the effective distance that the pump pulse 207 will lag behind the signal pulse 206 if they arrived at the optical substrate 210 together (i.e., temporally aligned). The OPL can be converted to a time by dividing the OPL by the speed of light in a vacuum, c.

Although depiction 200 shows the front surface coating 211 of the optical substrate 210 selectively reflecting the signal pulse 206 and the back surface coating reflecting the pump pulse 207, this arrangement can be switched so that the front coating 211 selectively reflects the pump pulse 207 and the back coating reflects the signal pulse 206. Having the front coating 211 of the optical substrate 210 selectively reflecting the signal pulse 206 and the back surface coating reflecting the pump pulse 207 is generally a better arrangement for system performance because it reduces the material dispersion of the system which helps preserve the short pulse width (e.g. ≤1 ps) of the signal pulse.

Another advantage of this arrangement is that the optical substrate 210 only has to transmit the pump wavelength with low losses and does not transmit the signal wavelength. This allows use of a wider choice of materials for optical substrate 210 (besides conventional sapphire for OPAs, for example), which can include glasses containing primarily silica (>50 wt. % silica) in amorphous (non-crystalline) form, such as BK7® glass and quartz, for example, which are more commercially available and are generally substantially lower in cost as compared to sapphire. BK7® is a widely used borosilicate crown glass that has a transmittance window of approximately 350-2200 nm, and an index of refraction of 1.519 at 532 nm.

Figure 3:
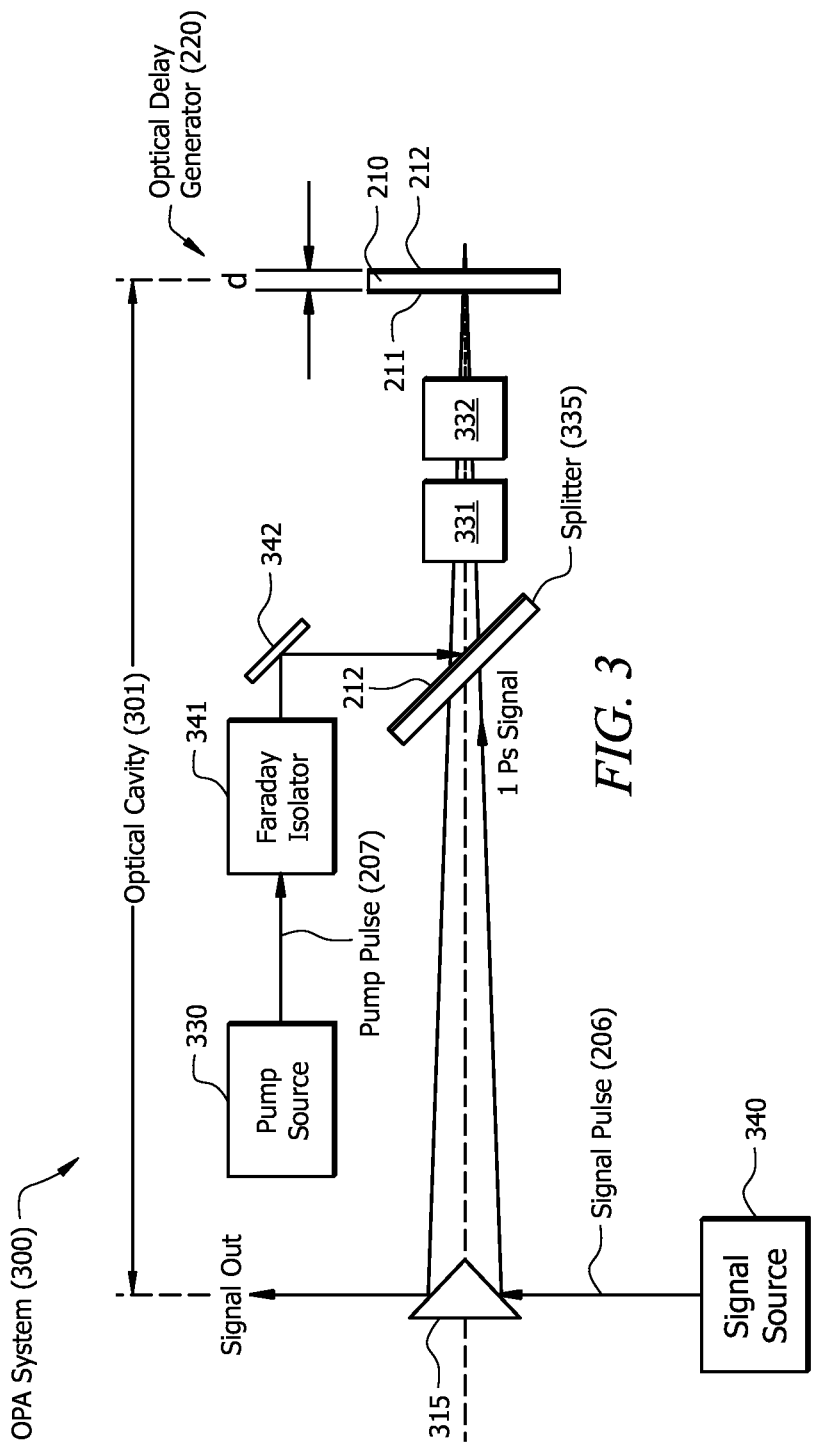
FIG. 3 is block diagram depiction of a double-pass OPA system including a disclosed monolithic fixed optical delay generator for time synchronization of first and second pass signal pulses and a pump pulse, where the monolithic fixed optical delay generator comprises a coated optical substrate that provides the back mirror in the system, and wherein the front coating reflects the signal pulse but not the pump pulse, with the back coating reflecting the pump pulse, according to a disclosed embodiment.

FIG. 3 is block diagram depiction of a double-pass OPA system 300 including an optical delay generator 220 for time synchronization of a pump pulse 207 and first and second pass signal pulses 206, according to a disclosed embodiment. The optical delay generator 220 comprises a coated optical substrate that provides the back mirror in the system 300. The front surface of the optical delay generator 220 includes a front coating 211 that highly reflects the signal pulse 206 while transmitting the pump pulse, with the back surface including a back coating 212 that highly reflects the pump pulse. As noted above, the pump pulse 206 and signal pulse 207 are typically spaced apart in wavelength by more than 100 nm.

The system 300 comprises a front mirror shown as an example right angle prism 315 which together with optical delay generator 220 that functions as a back mirror defines the optical cavity 301 of system 300. The system 300 includes at least one NL crystal inside the optical cavity 301, shown as a first NL crystal 331 and a second NL crystal 332. BBO (β-barium borate) is a conventional NL crystal material, but is not the only suitable NL crystal for disclosed embodiments. KDP (potassium dihydrogen phosphate), KTP (potassium titanyl phosphate), and lithium niobate (LN) are examples of other known NL crystals that may be used with disclose embodiments. As known in the art, NL crystals are chosen after making design compromises that involve a variety of characteristics including optical transmission, available size, cost, performance, lead time, phase matching bandwidth, ease of use, etc.

Although two NL crystals 331, 332 are shown in FIG. 3, a single NL crystal can be used instead of the two NL crystals shown. However, there are certain advantages using two NL crystals. One of the requirements of phase matching in an OPA system is to have an optical crystal with two indexes of refraction (a birefringent material). Because of this property the pump pulse and signal/idler pulses do not stay on top of each other because they angle differently as they propagate along the length of the NL crystal. This is referred to in the optical arts as "walk-off." Walk-off places a limitation on the length of the NL crystal that can be used and therefore the maximum obtainable gain in an OPA system from a single crystal since optical gain can only exist when the pump pulse overlaps with the signal pulses simultaneously in both space and time. As known in the art, walk-off being a spatial issue cannot be compensated by temporal alignment of the pump and signal pulses.

The detrimental effect of walk-off (i.e., gain limitation) can be somewhat alleviated by using two identical (size and material) NL crystals in the OPA (or OPO for that matter) as shown in FIG. 3. The two NL crystals 331 and 332 are placed into the optical path in identical fashion except that they are 180° out of phase on the optical axis 301 of the system 300 that causes walk-off (i.e., one of the NL crystal is "flipped over.") The second NL crystal (e.g., 332) is aligned to produce a walk-off opposite to the direction of the walk-off caused by the first NL crystal (e.g., 331). As a result, the first NL crystal 331 causes the pump and signal pulses to spatially separate while the second crystal 332 causes the pump and signal pulses to spatially converge by the separation amount (i.e., to thus come back together spatially).

System 300 includes a pump pulse source 330 for providing pump pulses 206 into the optical cavity of the system 300, such as a YAG laser that provides a wavelength of 1064 nm, or uses one of its harmonics (e.g., 532 nm or 355 nm which are simply the second and third harmonics, respectively, of a 1064 nm laser). Pump pulses from pump pulse source 330 can be in the form of a train of pulses, such as Q-switched pulses. A Faraday isolator 341 receives and transmits the pump pulses which are incident on mirror 342 oriented to direct the pump pulses 207 to beam splitter 335 which is positioned in the optical cavity 301 of the system 300. Beam splitter 335 has a reflective coating thereon shown as coating 212 that reflects the pump wavelength to couple the pump pulses 207 into the optical cavity 301. A signal source 340 generates first and second signal pulses 206 that are coupled into the optical cavity by prism 315. Signal pulse source 340 can comprise an OPO or a laser.

The optical substrate 210 in FIG. 3 can be a sapphire ($Al_2O_3$) substrate. However, as described above, since the front mirror 211 highly reflects the signal pulse wavelength, so that the signal pulses are not transmitted through the optical substrate 210, the optical substrate 210 can comprise low cost optical materials, such as glasses containing primarily silica, such as BK7® and quartz. For example, to achieve the above-described time synchronization for a double-pass OPA with a 4 ps $\tau_{Delay}$ for the pump pulse with respect to the signal pulse in system 300, when optical substrate 210 comprises sapphire, which has a refractive index $n_f$=1.75 @ 1064 nm, the thickness (d) of optical substrate 210 can be calculated to be 343 μm (d=(c·$\tau_{Delay}$)/(2·$n_f$)). When optical substrate 210 comprises quartz, which has a refractive index $n_f$=1.46 @ 1064 nm, the thickness of optical substrate 210 can be calculated to be 411 μm.

Disclosed arrangements including disclosed optical delay generators avoid the traditional double-pass OPA setup that requires a multi-component optical-mechanical system-based optical delay generator that comprises a translation stage and a collection of mounting hardware, optical components, and knowledge in the process of alignment of such a system to provide an appropriate delay. Disclosed dual-pass OPA systems can be contrasted with conventional dual-pass OPA systems where the assembly of optics (beam splitter, mirror mount, two maximum reflection mirrors, two mirror mounts, translation stage, stage mounting hardware) is replaced by a single monolithic fixed optical delay generator 220 that can utilize a conventional fixed mirror mount.

Disclosed embodiments include methods of fabrication a monolithic fixed optical delay generator comprising selecting an optical substrate having a front face and a back face including a refractive index and a thickness selected to provide an optical path length (OPL) having a corresponding predetermined optical delay. A front coating is formed on the front face and a back coating is formed on the back face. Deposition processes can be used for the formation of the coatings. The front coating is (i) highly reflective to a first wavelength and highly transmissive to a second wavelength and the back coating is highly reflective to said second wavelength, or (ii) the front coating is highly reflective to the second wavelength and highly transmissive to the first wavelength and the back coating is highly reflective to the first wavelength.

Use of a single monolithic fixed optical delay generators as disclosed herein simplifies the construction and alignment of double-pass OPA systems whether it uses two walk-off compensating NL crystals 331, 332 as shown in FIG. 3, or uses just a single NL crystal. Disclosed optical delay generator can be designed using simple equations to ensure the returning pump and signal pulses are properly overlapped in time. The design process generally takes into consideration the induced pulse delay between the pump and signal pulses coming from propagation through the NL crystal(s) as well as the air (or other ambient) based propagation effects dependent on where the optical delay generator will be positioned in the OPA system. Having the entire delay generator provided by a monolithic fixed optical delay generator as disclosed herein allows the optical delay generator to be placed directly after the OPA NL crystal(s) almost in physical contact with the exit face of the last NL crystal (NL crystal 332 in FIG. 3). This greatly reduces or even eliminates any detrimental effects from atmospheric propagation. One can then place an energy meter at the output of the OPA (shown as "signal out" in FIG. 3) and adjust the temporal synchronization of the pump pulse 206 from pump source 330 and signal pulses 207 from signal source 340 to maximize the output energy provided by the OPA system 300.

Disclosed monolithic fixed optical delay generators are highly accurate, and generate a known and fixed time delay that are tunable based on the design parameters associated with the OPL of the generator to generally implement any desired time delay value. Dual-pass OPA systems having disclosed monolithic fixed optical delay generators are more tolerant to misalignment, temperature changes, etc. and are cheaper to produce as compared to conventional dual-pass OPA systems that rely on optical-mechanical system-base optical delay including a translation stage as described in the background above. Moreover, disclosed dual-pass OPA systems are smaller in size, lighter, and simpler as compared to conventional dual-pass OPA systems and related methods. Disclosed dual-pass OPA systems can also eliminate the need to verify that the temporal synchronization is indeed correct.

Disclosed embodiments can be applied in a variety of applications besides the above-disclosed use in double-pass OPA applications. For example, precision optical delays are ubiquitous in optical systems beyond OPAs. For instance there are diagnostic systems whose results are critically dependent on the known optical delay of the system that can benefit from disclosed monolithic fixed optical delay generators. Disclosed monolithic fixed optical delay generators may also be used as fixed optical delay elements in fiber-optic systems.

Figure 4:
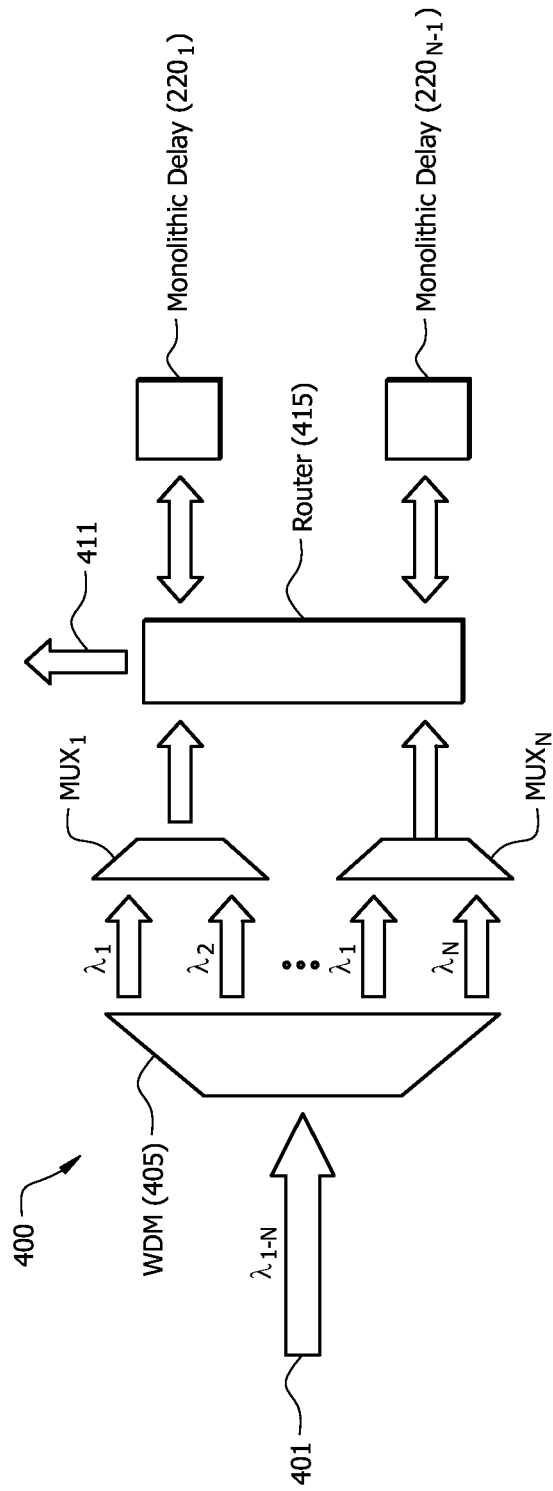
FIG. 4 is block diagram depiction of a fiber optic-based wavelength division multiplex (WDM) communication system including a plurality of disclosed monolithic fixed optical delay generators, according to an example embodiment.

FIG. 4 is block diagram depiction of a fiber optic-based WDM communication system 400 including a plurality of disclosed monolithic fixed optical delay generators, according to an example embodiment. System includes a single optical fiber 401 with a plurality of channels ($Ch_1$ to $Ch_N$) transmitted on it each at a different wavelength ($\lambda_1$ to $\lambda_N$). It is assumed the respective channels $Ch_1/\lambda_1$ to $Ch_N/\lambda_N$ all need to be time synchronized to one another. $Ch_1$ is assumed to be the latest channel (e.g., due to the longest fiber length of the respective channels), so that in the particular arrangement shown $Ch_2/\lambda_2$ to $Ch_N/\lambda$n all precede $Ch_1/\lambda_1$ in time so that $Ch_2/\lambda_2$ to $Ch_N/\lambda$n each need a different time delay to be added to synchronize them with a common time reference, here $Ch_1/\lambda_1$.

WDM 405 acts as a de-multiplexer (de-MUX) to separate the respective channels $Ch1/\lambda_1$ to $Ch_N\lambda_N$. System 400 also includes a plurality of other WDMs that act as MUXs shown as $MUX_1$ to $MUX_N$ shown for combining each of $Ch_2/\lambda_2$ to $Ch_N/\lambda_N$ with $Ch1/\lambda_1$. After combination of the channel pairs by $MUX_1$ to $MUX_N$ the respective MUX outputs are sent to a router 415. Router 415 directs the channel pairs to respective monolithic fixed optical delay generators $220_1$ to $220_{N-1}$ which each provide different time delays for time synchronization of all the respective channels relative to $Ch1/\lambda_1$. Once $Ch_1/\lambda_1$ to $Ch_N/\lambda_N$ come out of the delay generators $220_1$ to $220_{N-1}$ they are all time synchronized to $Ch1/\lambda_1$. The time synchronized $Ch_1/\lambda_1$ to $Ch_N/\lambda_N$ and are all coupled back into the router 415, and are shown output from the top of the router 415 after combining by another MUX (not shown) into a common single fiber 411 on route to their ultimate destination via transmission over the single fiber 411.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

The terminology used herein is for the purpose of describing particular embodiments only and is not intended to be limiting to this Disclosure. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this Disclosure belongs. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

I claim:

1. A dual-pass Optical Parametric Amplifier (OPA) system, comprising: an optical cavity comprising a front mirror and a back mirror;
    at least one non-linear crystal within said optical cavity; a pump source for providing a pump pulse at a first wavelength coupled into said optical cavity, and a signal source for generating a signal pulse at a second wavelength coupled into said optical cavity, wherein said back mirror comprises a monolithic fixed optical delay generator, said monolithic fixed optical delay generator comprising:
    an optical substrate that has a front coating and back coating bonded thereon, wherein (i) said front coating is highly reflective to said signal pulse and highly transmissive to said pump pulse, and said back coating is highly reflective to said pump pulse or (ii) said front coating is highly reflective to said pump pulse and highly transmissive to said signal pulse and said back coating is highly reflective to said signal pulse, and Wherein said optical substrate has a thickness and refractive index to provide a fixed relative delay between said signal pulse and said pump pulse.

2. The OPA system of claim 1, wherein said at least one non-linear crystal comprises a first non-linear crystal and a second non-linear crystal, said first and second non-linear crystals positioned 180° out of phase from one another.

3. The OPA system of claim 1, wherein said front coating is highly reflective to said signal pulse and said back coating is highly reflective to said pump pulse.

4. The OPA system of claim 3, wherein said optical substrate comprises a glass containing primarily silica.

5. The OPA of claim 3, wherein said front coating is configured to provide anti-reflection for said pump pulse.

6. The OPA system of claim 1, wherein said front coating comprises a dielectric coating and said back coating comprises a metal coating.

7. The OPA system of claim 1, wherein said front coating is highly reflective to said pump pulse and said back coating is highly reflective to said signal pulse.

8. A method comprising:
    providing a dual-pass optical parametric amplifier having an optical cavity comprising a front mirror and a back mirror and at least one non-linear crystal within said optical cavity;
    providing, by a pump source, a pump pulse at a first wavelength coupled into said optical cavity;
    generating, by a signal source, a signal pulse at a second wavelength coupled into said optical cavity;
    generating a predetermined optical delay, by the back mirror having a monolithic fixed optical delay generator having an optical substrate having a front face with a front coating, a back face with a back coating, and a refractive index and a thickness selected to provide an optical path length (OPL) having the predetermined optical delay between the signal pulse and the pump pulse; and
    reflecting, by said front coating, a first wavelength and being highly transmissive to a second wavelength and reflecting, by said back coating, said second wavelength or reflecting, by said front coating, said second wavelength and being highly transmissive to said first wavelength and reflecting, by said back coating, said first wavelength.

9. The method of claim 8, wherein said front coating is highly reflective to the signal pulse and said back coating is highly reflective to the pump pulse.

10. The method of claim 9, wherein said optical substrate comprises a glass containing primarily silica.

11. The method of claim 9, wherein said front coating is configured to provide anti-reflection for said pump pulse.

12. The method of claim 8, wherein said front coating comprises a dielectric coating and said back coating comprises a metal coating.

13. The method of claim 8, wherein said front coating is highly reflective to the pump pulse and said back coating is highly reflective to the signal pulse.

* * * * *

UNITED STATES PATENT AND TRADEMARK OFFICE
CERTIFICATE OF CORRECTION

Page 1 of 1

PATENT NO. : 9,007,678 B2
APPLICATION NO. : 13/313347
DATED : April 14, 2015
INVENTOR(S) : Edward Miesak It is certified that error appears in the above-identified patent and that said Letters Patent is hereby corrected as shown below:

In the Claims

Column 9, claim 1, line 53, delete "Wherein" and insert --wherein--.

Signed and Sealed this
Eighteenth Day of August, 2015

Michelle K. Lee
*Director of the United States Patent and Trademark Office*